(12) United States Patent
Cornell et al.

(10) Patent No.: US 8,274,524 B1
(45) Date of Patent: Sep. 25, 2012

(54) MAP RENDERING USING INTERPOLATION OF STYLE PARAMETERS ACROSS ZOOM LEVELS

(75) Inventors: Brian Cornell, Kenmore, WA (US); James Darpinian, Seattle, WA (US); Daniel Otero, Seattle, WA (US); Jennifer Maurer, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/247,637

(22) Filed: Sep. 28, 2011

(51) Int. Cl.
    *G09G 5/00* (2006.01)
(52) U.S. Cl. ......... 345/581; 345/428; 345/619; 345/660
(58) Field of Classification Search .................. None
    See application file for complete search history.

(56) References Cited

U.S. PATENT DOCUMENTS

| | | |
|---|---|---|
| 5,613,048 A | 3/1997 | Chen et al. |
| 5,701,405 A | 12/1997 | Kelley et al. |
| 5,798,770 A | 8/1998 | Baldwin |
| 6,016,151 A | 1/2000 | Lin |
| 6,028,584 A * | 2/2000 | Chiang et al. .................. 345/628 |
| 6,324,469 B1 | 11/2001 | Okude et al. |
| 6,411,293 B1 | 6/2002 | Sakamoto et al. |
| 6,597,354 B2 | 7/2003 | Sakamoto et al. |
| 6,744,431 B2 | 6/2004 | Sakamoto et al. |
| 6,822,650 B1 | 11/2004 | Davis et al. |
| 6,888,544 B2 | 5/2005 | Malzbender et al. |
| 6,952,661 B2 | 10/2005 | Agrawala et al. |
| 6,975,329 B2 | 12/2005 | Bastos et al. |
| 6,999,075 B2 | 2/2006 | Kumagai |
| 7,076,409 B2 | 7/2006 | Agrawala et al. |
| 7,176,925 B2 | 2/2007 | Davis et al. |
| 7,471,296 B2 | 12/2008 | Davis et al. |
| 7,839,926 B1 * | 11/2010 | Metzger et al. .......... 375/240.01 |
| 2002/0076099 A1 | 6/2002 | Sakamoto et al. |
| 2005/0140676 A1 | 6/2005 | Cho |
| 2005/0206657 A1 * | 9/2005 | Arcas ........................... 345/660 |
| 2005/0223311 A1 * | 10/2005 | Bricklin et al. ............. 715/501.1 |
| 2006/0138238 A1 * | 6/2006 | Johnston et al. ......... 235/462.32 |
| 2006/0267982 A1 * | 11/2006 | Aguera y Arcas ............ 345/428 |
| 2008/0303841 A1 * | 12/2008 | Newhall, Jr. .................. 345/587 |
| 2011/0016412 A1 | 1/2011 | Grosz et al. |
| 2011/0054857 A1 | 3/2011 | Moguchaya |
| 2011/0074811 A1 * | 3/2011 | Hanson et al. ................ 345/629 |
| 2011/0130949 A1 | 6/2011 | Arrasvuori |

* cited by examiner

*Primary Examiner* — Kee M Tung
*Assistant Examiner* — Jwalant Amin
(74) *Attorney, Agent, or Firm* — Marshall, Gerstein & Borun LLP (57) ABSTRACT

A graphics or image rendering system, such as a map image rendering system, may receive map data associated with a set of zoom levels, where the map data includes style attribute data corresponding to various features of a map surface at corresponding zoom levels. The system may interpolate at least some of the style parameter values from the received map data to provide style parameter values over a range of zoom levels.

28 Claims, 6 Drawing Sheets

|  | Attribute | Object Type | Location | | |
|---|---|---|---|---|---|
|  |  |  | X | Y | Z |
| 0 | Style 1 | Road | 14 | 56 | 24 |
| 1 | Style 1 | Road | 14 | 22 | 19 |
| 2 | Style 1 | Road | 18 | 72 | 44 |
| 3 | Style 2 | Area | 19 | 13 | 23 |
| ⋮ | ⋮ | ⋮ | ⋮ | ⋮ | ⋮ |
| 97 | Style 14 | Text Box | 56 | 12 | 31 |
| 98 | Style 14 | Text Box | 56 | 44 | 28 |

Vertex Data Point #

FIG. 3A

Style #

| | 0 | 1 | 2 | 3 | 4 | ... | N |
|---|---|---|---|---|---|---|---|
| 1 | 28 | 62 | 97 | 44 | 16 | | 13 |
| 2 | 7 | 42 | 43 | 12 | 18 | | 11 |
| 3 | . | . | . | . | . | | 9 |
| 4 | . | . | . | . | . | | 7 |
| ⋮ | | | | | . . . . . . . . . . . . . . | | |
| 15 | . | . | . | . | . | | . |

Vertex Attribute #

MAP RENDERING USING INTERPOLATION OF STYLE PARAMETERS ACROSS ZOOM LEVELS

FIELD OF TECHNOLOGY

The present disclosure relates to map rendering systems, such as electronic map display systems, and more specifically to a map rendering system that renders elements of map features using interpolated style parameter values across different zoom levels.

BACKGROUND

Digital maps are found in and may be displayed by a wide variety of devices, including mobile phones, car navigation systems, hand-held global positioning system (GPS) units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of rasterized or pixilated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects or elements (also referred to as primitives) to be displayed as part of an image via an image display device. In the context of a map image, such image elements or primitives may be, for example, individual roads, text labels (e.g., map or street labels), areas, text boxes, buildings, points of interest markers, terrain features, bike paths, etc. Each image element is generally made up or drawn as a set of one or more triangles (of different sizes, shapes, colors, fill patterns, etc.), with each triangle including three vertices interconnected by lines. Thus, for any particular image element, the image database stores a set of vertex data points, with each set of vertex data points defining a particular vertex of one of the triangles making up the image element. Generally speaking, each vertex data point includes data pertaining to a two-dimensional or a three-dimensional position of the vertex (in an X, Y or an X, Y, Z coordinate system, for example) and various vertex attributes defining properties of the vertex, such as color properties, fill properties, line width properties for lines emanating from the vertex, etc.

During the image rendering process, the vertices defined for various image elements of an image to be rendered are provided to and are processed in one or more image shaders which operate in conjunction with a graphics processing unit (GPU), such as a graphics card or a rasterizer, to produce a two-dimensional image on a display screen. Generally speaking, an image shader is a set of software instructions used primarily to calculate rendering effects on graphics hardware with a high degree of flexibility. Image shaders are well known in the art and various types of image shaders are available in various application programming interfaces (APIs) provided by, for example, OpenGL and Direct3D, to define special shading functions. Basically, image shaders are simple programs in a high level programming language, for example, that describe or determine the traits of either a vertex or a pixel. Vertex shaders, for example, define the traits (e.g., position, texture coordinates, colors, etc.) of a vertex, while pixel or fragment shaders define the traits (color, z-depth and alpha value) of a pixel. A vertex shader is called for each vertex in an image element or primitive so that, for each vertex input into the vertex shader, the vertex shader produces one (updated) vertex output. Each vertex output by the vertex shader is then rendered as a series of pixels onto a block of memory that will eventually be sent to a display screen.

Unfortunately, there are certain image processing actions, such as changing colors, fill properties, line widths, etc. of image objects or elements on a displayed map image that require the downloading of new vector data (with new properties or vertex attributes) from the map database or from the application or system creating the vector data points. As a result, it may be relatively time consuming to simply change style properties of rendered images, such as the colors or fill patterns of image elements (such as roads, for example), the line widths used to display image element outlines, text, etc., because doing so means that new vector data, with the new vertex attributes (style attributes) defining these new properties, must be sent to the rendering engine from the map database or other application. As a result, it is still relatively difficult to change or modify vector images created using vector data to perform simple visual modifications of features within the images themselves at the image rendering device, such as changing properties of map elements like line widths, color properties, etc.

SUMMARY

A computer-implemented method for rendering a map on a display device includes determining a first set of style parameters for a feature of a map at a first zoom level, a second set of style parameters for a second zoom level, and a third set of style parameters for a third zoom level, where the third set of style parameters is determined by interpolating the first and second set of style parameters. The method then renders or displays the first feature of the map in a viewing window based on the interpolated third set of style parameters. The method further determines a fourth set of style parameters based on a fourth zoom level and determines the third set of style parameters based on the first, second and fourth set of style parameters. The method further determines whether to retrieve the fourth set of style parameters based on a current bandwidth, a current processor capacity, or a resolution setting. The method includes using a linear interpolation process and/or a polynomial interpolation process.

In one embodiment, style attribute information may be stored as a style lookup table and the method may determine style attribute tables that are associated with the first, second, third and/or fourth zoom levels.

In one embodiment, the method may determine to retrieve only a subset of available style parameters for a given zoom level based on any combination of an interpolation attribute, a priority attribute, a current bandwidth, or a current processor capacity.

In another embodiment, a computer device includes a communications network interface, one or more processors, one or more memories coupled to the one or more processors and a display device coupled to the one or more processors. The one or more memories include computer executable instructions that are executed on the processor to determine a first view of a map surface defined by a first magnification of the surface of the map, where a first zoom level of the first view corresponds to the first magnification. The computer executable instructions are executed to retrieve a first set of style parameters for a first feature of the map surface, the first set of style parameters corresponding to the first zoom level. The computer executable instructions are executed to determine a second view of the map surface defined by a second magnification of the map surface, where a second zoom level of the second view corresponds to the second magnification. The computer executable instructions are executed to retrieve a second set of style parameters for the first feature of the map surface, the second set of style parameters corresponding to a third zoom level, where the third zoom level corresponds to a third magnification different from the first and the second magnification. The computer executable instructions are executed to determine a third set of style parameters for the first feature of the map surface at the second zoom level based on interpolating the first set of style parameters and the second set of style parameters when the second zoom level is between the first and third zoom level. The computer executable instructions are executed to render the first feature in the second view at the second zoom level using the third set of style parameters.

The computer device executes the computer executable instructions to retrieve the first and the second set of style parameters as a subset of style parameters available for retrieval based on a style attribute setting associated with each of the style parameters indicating whether the style parameter is designated for interpolation.

The computer device executes the computer executable instructions to retrieve the first and the second set of style parameters as a subset of style parameters available for retrieval based on a style priority attribute associated with each of the style parameters.

The computer device executes the computer executable instructions to retrieve the first and the second set of style parameters as a subset of style parameters available for retrieval based on whether a current processor capacity is above a threshold.

The computer device executes the computer executable instructions to retrieve the first and the second set of style parameters as a subset of style parameters available for retrieval based on whether a current available bandwidth is above a threshold.

The computer device executes the computer executable instructions to retrieve a fourth set of style parameters for the first feature of the map surface when a resolution setting is increased, the fourth set of style parameters corresponding to a fourth zoom level, wherein the fourth zoom level corresponds to a fourth magnification different from the first, the second, and the third magnification. The computer device executes the computer executable instructions to determine the third set of style parameters for the first feature of the map surface at the second zoom level based on interpolating at least the first set of style parameters at the first magnification, the second set of style parameters at the second magnification, and the fourth set of style parameters at the fourth magnification, wherein the third magnification is different from the first, second, and fourth magnification.

In another embodiment, a computer device includes a communications network interface, one or more processors, one or more memories coupled to the one or more processors and a display device coupled to the one or more processors. The one or more memories include computer executable instructions that are executed on the processor to determine a first view of a map surface defined by a first magnification of the surface of the map, and where a first zoom level of the first view corresponds to the first magnification. The computer executable instructions are executed to retrieve a first set of style parameters for a first feature of the map surface, the first set of style parameters corresponding to a zoom level closest to the first zoom level. The computer executable instructions are executed to determine if the first set of style parameters corresponds to the first zoom level. The computer executable instructions are executed to render a first feature in the first view at the first zoom level using the first set of style parameters if the first set of style parameters corresponds to the first zoom level. The computer executable instructions are executed to retrieve a second set of style parameters for the first feature of the map surface if the first set of style parameters do not correspond to the first zoom level, the second set of style parameters corresponding to a third zoom level, where the third zoom level corresponds to a third magnification different from the first and the second magnification and where the first zoom level is between the second and the third zoom level. The computer executable instructions are executed to determine a third set of style parameters for the first feature of the map surface at the first zoom level based on interpolating the first and the second set of style parameters. The computer executable instructions are executed to render the first feature in the first view at the first zoom level using the third set of style parameters.

DETAILED DESCRIPTION

The present application generally relates to techniques for rendering map features during zooming operations of a viewing window. A graphics or image rendering system, such as a map image rendering system, may receive map data for a given set of zoom levels, where the map data includes style parameter values for various features of a map surface, where the style parameter values correspond to a particular zoom level. The techniques may interpolate at least some of the style parameter values from the received map data to provide style parameter values over a range of zoom levels and the map image rendering system may render a viewing window at a zoom level based on the interpolated style parameters.

Figure 1:
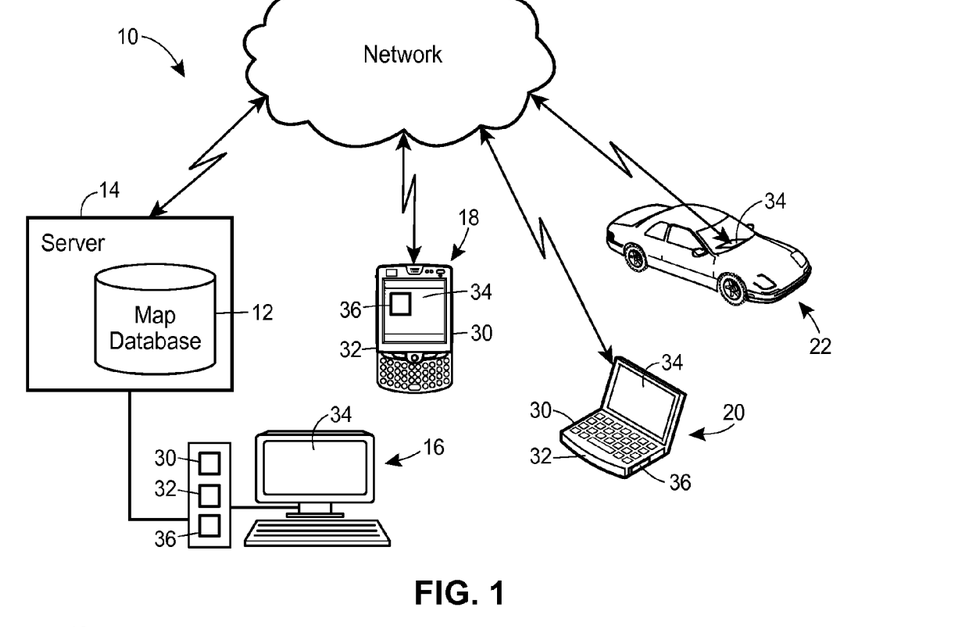
FIG. 1 is a high-level block diagram of a map imaging system that implements communications between a map database stored in a server and one or more map image rendering devices, according to an embodiment.

Referring now to FIG. 1, a map-related imaging system 10, according to an embodiment, includes a map database 12 stored in a server 14 or in multiple servers located at, for example, a central site or at various different spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless local area network (LAN), metropolitan area network (MAN) or wide area network (WAN), the Internet, or any combination thereof. The map client devices 16-22 may be, for example, mobile phone devices (18), computers such a laptop, tablet, desktop or other suitable types of computers (16, 20) or components of other imaging systems such components of automobile navigation systems (22), etc. Moreover, the client devices 16-22 may be communicatively connected to the server 14 via any suitable communication system, such as any publicly available and/or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. However, the image rendering systems described herein are best suited for use with vector image data which defines or includes a series of vertices or vertex data points for each of numerous sets of image objects, elements or primitives within an image to be displayed. Generally speaking, each of the image objects defined by the vector data will have a plurality of vertices associated therewith and these vertices will be used to display a map related image object to a user via one or more of the client devices 16-22. As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally, speaking, the map-related imaging system 10 of FIG. 1 operates such that a user, at one of the client devices 16-22, opens or executes a map application (not shown in FIG. 1) that operates to communicate with and obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
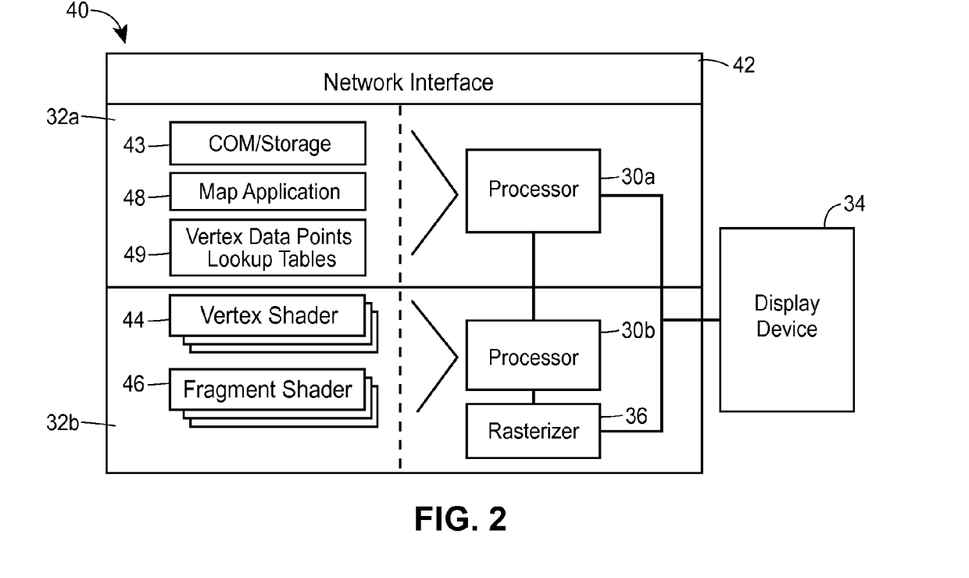
FIG. 2 is a high level block diagram of an image rendering engine used to render map images using map vector data, according to an embodiment.

Referring now to FIG. 2, an image generation or imaging rendering device 40, according to an embodiment, associated with or implemented by one of the client devices 16-22 is illustrated in more detail. The image rendering system 40 of FIG. 2 includes two processors 30a and 30b, two memories 32a and 32b, a user interface 34 and a rasterizer 36. In this case, the processor 30b, the memory 32b and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one more map applications 48 having map display logic therein stored on the memory 32a, which may be executed on the processor 30a (e.g., which may be a central processing unit (CPU)). Likewise one or more image shaders in the form of, for example, vertex shaders 44 and fragment shaders 46 are stored on the memory 32b and are executed on the processor 30b. The memories 32a and 32b may include either or both volatile and non-volatile memory and the routines and shaders are executed on the processors 30a and 30b to provide the functionality described below. The network interface 42 includes any well known software and/or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory for example, that stores vector data received from the map database 12, the vector data including any number of vertex data points and one or more lookup tables as will be described in more detail.

During operation, the map logic of the map application 48 executes on the processor 30 to determine the particular image data needed for display to a user via the display device 34 using, for example, user input, GPS signals, prestored logic or programming, etc. The display or map logic of the application 48 interacts with the map database 12, using the communications routine 43, by communicating with the server 14 through the network interface 42 to obtain map data, preferably in the form of vector data or compressed vector data from the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30*a*. In one embodiment, the image data sent from the server 14 includes vector data generally defining data for each of a set of vertices associated with a number of different image elements or image objects to be displayed on the screen 34 and possibly one or more lookup tables which will be described in more detail below. If desired, the lookup tables may be sent in, or may be decoded to be in, or may be generated by the map application 48 to be in the form of vector texture maps which are known types of data files typically defining a particular texture or color field (pixel values) to be displayed as part of an image created using vector graphics. More particularly, the vector data for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as an attribute reference. Each vertex data point may additionally include other information, such as an object type identifier that identifies the type of image object with which the vertex data point is associated. The attribute reference, referred to herein as a style reference or as a feature reference, references or points to a location or a set of locations in one or more of the lookup tables downloaded and stored in the data memory 43.

Figure 3A:
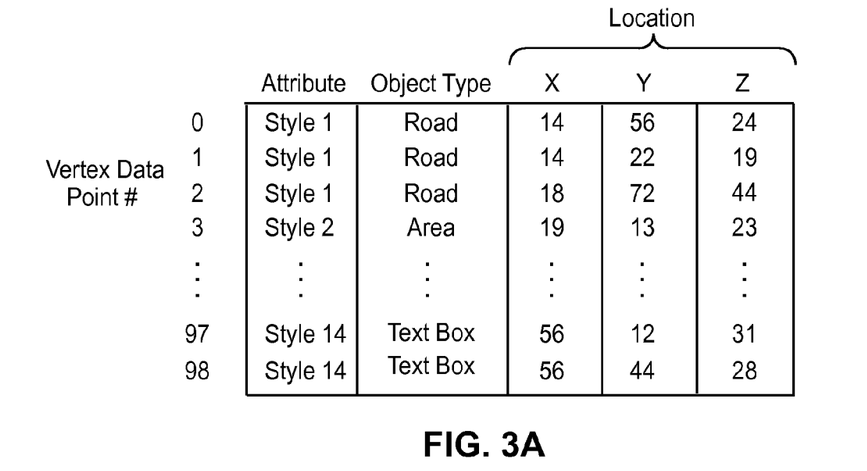
FIG. 3A is a data diagram illustrating a set of vector data in the form of vertex data points encoded using a vertex style attribute, according to an embodiment.
Figure 3B:
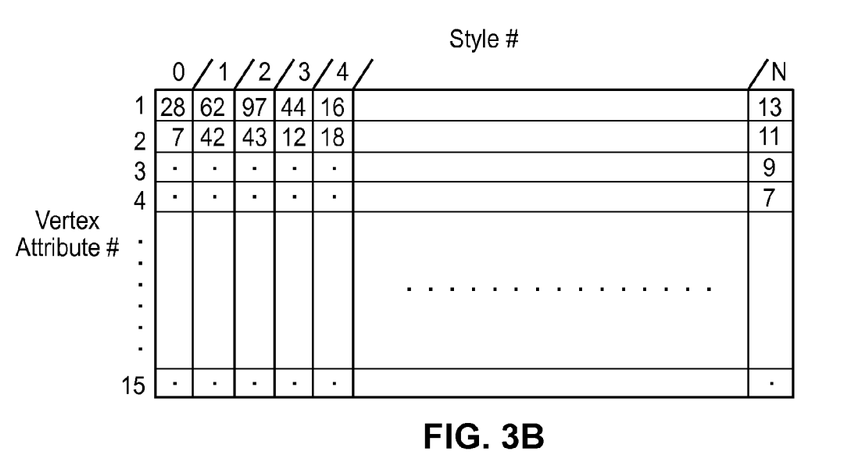
FIG. 3B is a first texture map in the form of a style lookup table that defines vertex style attribute values for each of a number of different styles and which is used in the image rendering engine of FIG. 2 to resolve vertex style attributes based on a style reference, according to an embodiment.

FIG. 3A illustrates an embodiment of map data that may be sent to a client device, such as device 40 of FIG. 2, for processing, according to an embodiment. As FIG. 3A illustrates, map data contains location data for a vertex, an object type, and a style attribute(s) for the vertex. A set of one or more of the vertices may comprise an image object or feature of a map, such as a road or building. The style attributes may be sent for each vertex or may reference a style look up table such as that illustrate in FIG. 3B that can be used to decode a style reference from FIG. 3A into a complete set of one or more style attribute parameters values, according to an embodiment.

Style parameters may include a fill color (e.g., for area objects), an outline color, an outline width, an outline dashing pattern and an indication of whether to use rounded end caps (e.g., for road objects), an interior color, an interior width, an interior dashing pattern, and interior rounded end caps (e.g., for road objects), a text color and a text outline color (e.g., for text objects), an arrow color, an arrow width, an arrow dashing pattern (e.g., for arrow objects), a text box fill color and a set of text box outline properties (e.g., for text box objects) to name but a few. Of course, different ones of the vertex style attributes provided may be applicable or relevant to only a subset of image objects and thus the vertex style data points associated with a particular type of image object may only refer to a subset of the vertex attributes listed for each style.

Generally speaking, the techniques for rendering a map involve determining a viewing window of a map surface at a first zoom level and determining a set of style parameters for a plurality of zoom levels (a set comprises one or more elements). When a viewing window is to be rendered at the first zoom level, the techniques described herein may interpolate across the plurality of style parameters to provide style parameter values appropriate for the first zoom level.

A zoom level generally corresponds to a magnification which is used, in part, to define a displayable area of a map surface within a viewing window. A magnification of the viewing window may correspond with a scale for which the map surface is rendered or drawn. For example, where magnification or scale is expressed as a ratio such as 1:1,000, one of any unit of measurement on the viewing window may correspond exactly or approximately to 1,000 actual units. When the viewing window size is measured in inches, the distance scale may translate an inch of the viewing window to a length of 1,000 miles (or kilometers).

Some computerized maps allow users to zoom in or zoom out of a map surface, where a zoom level generally corresponds to a magnification of the viewing window that displays the map surface. Unlike a paper map that displays all possible map surface data in one fixed rendering, computer mapping applications may only display certain map features that can be resolved by eye at a certain zoom level or magnification (corresponding to a distance to the object) while excluding other map features that normally cannot be seen by eye at the same zoom level without the aid of a magnification device. In these computer mapping applications, increasing a zoom level of a viewing window may not only enlarge features already displayed on a map, but also cause the mapping application to draw additional features of the map.

Not all zoom level increases, however warrant drawing additional map features. For example, where an increase in magnification between a first and a second zoom level of a mapping application is relatively small, existing features of the map surface may simply be magnified without any additional feature data rendered. This viewing difference between magnification of existing objects and magnification plus additional rendering of map data may be demonstrated as follows. When increasing magnification of a map surface without retrieving additional zoom level data tiles, a building represented as a block (or square) will simply be displayed as an enlarged block (or square). When increasing magnification and retrieving additional zoom level data, the same building may be displayed as an enlarged block but with additional sub-features such as windows, columns doors, etc.

Figure 4:
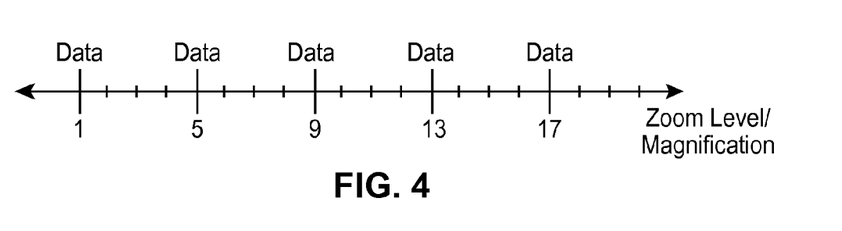
FIG. 4 illustrates a zoom scale including multiple zoom levels, according to an embodiment.

FIG. 4 illustrates a zoom scale including multiple zoom levels increasing from left to right, according to an embodiment. As discussed, each incremental zoom level generally corresponds to a particular magnification level. However, not all zoom levels involve acquisition of additional, usually higher resolution map data for rendering. FIG. 4 illustrates that zoom levels 402 are zoom levels that involve additional retrieval of map data and additional processing of that map data. Zoom levels 404 involve magnification but do not involve additional retrieval of map data and additional processing of that map data.

As discussed above, map vector data may comprise location data and/or style attribute data for a set of vertices. The map vector data may be segregated or organized by zoom level, similar to that illustrated in FIG. 4, and style attribute data may be provided along with the map data at the particular zoom levels. When style information is not provided for a zoom level, style information may simply be drawn from existing or previous style attributes from other zoom levels. Generally, this may provide abrupt changes in a visual aspect of a feature as a viewing window changes, for example when zoom level changes.

Figure 5A:
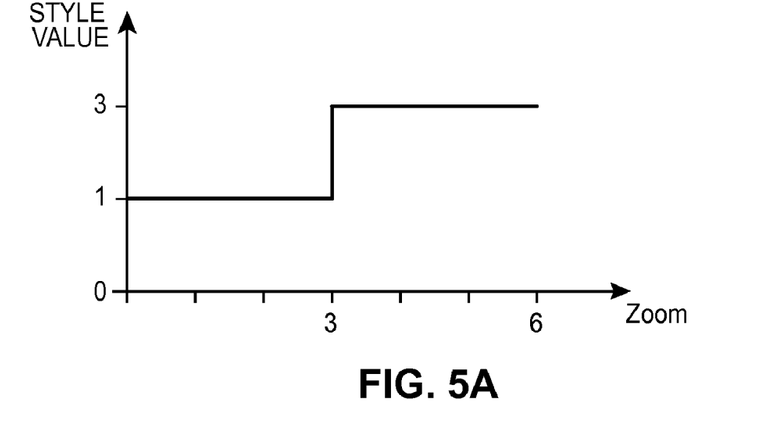
FIG. 5A illustrates a graph of style parameter values and zoom level without interpolation.

FIG. 5A illustrates a graph of style parameter values and zoom level. Map data may be available for retrieval and rendering at zoom level 0. The map data may include style attribute data that corresponds with and is appropriate for zoom level 0 magnification. For example, where style attribute data corresponds to a width of a road, the style attribute value available for zoom level 0 may have the road width scaled appropriately for that zoom level. When additional data for zoom levels 1 and 2 are not available, some mapping systems may simply use the available style data from zoom level 0 for zoom levels 1 and 2. In the example of road width, the same road width value may be used for zoom levels 1 and 2 as for level 0. Additional map data may be available for zoom level 3 that includes style data that corresponds with and is appropriate for zoom level 3 magnification. Again, where zoom level data is not available for zoom levels 4 and 5, previously retrieved and available style data may be used for that zoom range. Abrupt style changes may occur between certain zoom levels, e.g., between zoom level 2 and 3 as illustrated in FIG. 5A.

One method of remedying these abrupt changes is to provide style parameters for each zoom level. However, this can be costly in terms of retrieval bandwidth (such as network bandwidth between two or more computers or intra device communication bandwidth between a processor and a local memory) and processor capacity. Graphics cards (having dedicated graphics processing units), such as those described in this application, are designed to specifically and efficiently process graphics calculations which often involve mathematical interpolations. In some embodiments, client processing efficiencies (e.g., interpolation calculation resources of a graphics card) may be utilized for interpolating certain style parameters for rendering an image of a map when a viewing window changes from one zoom level to another. In other embodiments, a CPU, such as the CPU 30a (FIG. 2) may be utilized to interpolate style parameters.

Figure 5B:
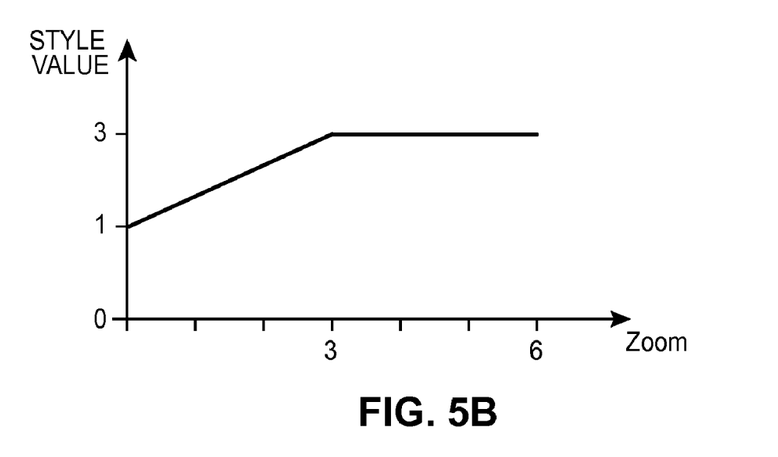
FIG. 5B illustrates a graph of style parameter values and zoom level with linear interpolation, according to an embodiment.
Figure 5C:
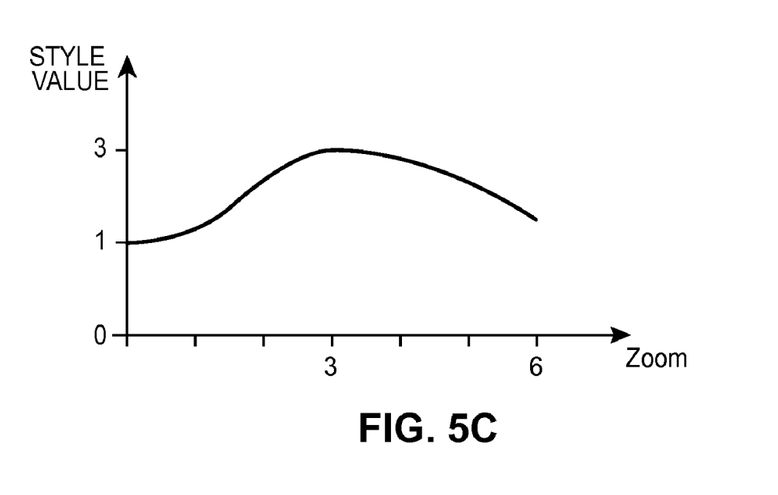
FIG. 5C illustrates a graph of style parameter values and zoom level with polynomial interpolation, according to an embodiment.

FIG. 5B illustrates a linear interpolation of style parameter values between the zoom levels 0 and 3, which are zoom levels in which map data is available and where the style values of those zoom levels are appropriate for their respective magnifications, according to an embodiment. As illustrated in FIG. 5B, a smoother transition line can be made in parameter values as compared to FIG. 5A, for example. FIG. 5C illustrates a more complex interpolation of three or more points (including map data at zoom level 6) that can provide a smoother style function over a range of magnifications or zoom levels, according to an embodiment. The interpolation of FIG. 5C may involve a polynomial interpolation function, for example.

In some embodiments, while rendering richer style aspects of map features may be accomplished by sending more data (i.e., style attribute data) from a server to a client for every view change (e.g., zoom level change), having a graphics processor card perform a bulk of calculations for adjusting style changes at a client device may save both bandwidth and time of download, as well as decrease overall system processing times since specialized graphics cards can more efficiently process style adjustments at a client than, for example, at a server for a plurality of clients. Thus, an aspect of the techniques is determining a reduced set of style parameters that may be retrieved by a client for applying interpolation processing, for example via a graphic cards/processor. In other embodiments, however, a CPU, such as the CPU 30a (FIG. 2) may be utilized to interpolate style parameters.

Figure 6:
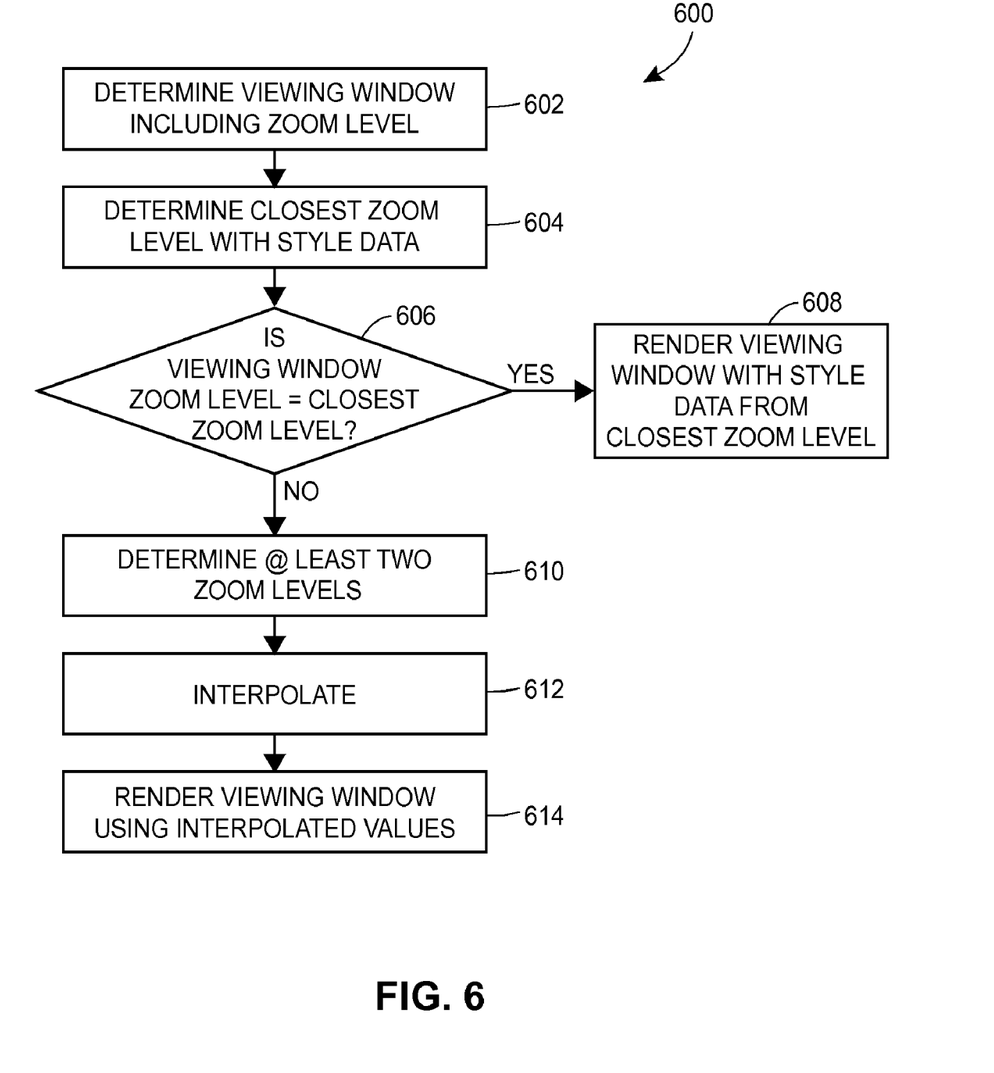
FIG. 6 illustrates a process flow diagram of a method that may be used to render a map surface using the described interpolation techniques, according to an embodiment.

FIG. 6 illustrates a process flow diagram or flow chart of a method, routine, or process 600 that may be used to render a map surface using a suitable interpolation technique, such as interpolation techniques disclosed herein, according to an embodiment. In any event, a block 602 may determine a viewing window state with respect to a map surface to be displayed. This viewing window state may include a viewing window magnification as well as a viewing window size, a viewing window position, and a viewing window direction for a view of a map surface. This determination may be made by receiving an input from a user of a computer device. For example, the user may input a particular longitude, latitude, and altitude, as well as a zoom level corresponding to a magnification level and a viewing angle (i.e., a viewing direction). In some embodiments, the determination may be made based on a pre-stored or pre-determined value for an initial rendering of a map location (e.g., an initial view of a city landmark or popular city feature) or may be based on pre-stored settings that are based on user preferences. As another example, a determination may be made in response to a user input indicating a pan action (e.g., a selection of an arrow indicating a pan in a particular direction, a swipe, etc.), a selection of a map feature or map point (e.g., via a touch screen press, a mouse click, etc.), etc.

A block 604 may determine a closest zoom level which has associated style attribute data that is appropriate for that zoom level. Determining a closest zoom level may be accomplished by any programmatic manner. For example, a closest zoom level may be determined by querying a lookup table that provides information on available zoom levels and that indicates what zoom levels are associated with style attribute data that is appropriate for that zoom level. In situations in which map data is always provided with attribute data for particular zoom levels, the determination may be based on querying for a prior lower level zoom level or a subsequent higher level zoom level that initiates a retrieval of additional data. A block 606 may determine whether a current viewing window zoom level (as determined to be part of the viewing state of block 602) is the same as the closest zoom level of block 604. If the current viewing window is the same as the closest zoom level data, then the style attribute data for the current zoom level may be used to render the viewing window at block 608 without interpolation since the current zoom level already contains data appropriate for the zoom level. In one embodiment, block 604 may not select the closest zoom level that contains an associated style attribute data for the zoom level. Instead, block 604 may choose a second closest, third closest, etc. This may be the case, when, for example, the closest zoom level that has associated style attribute data may not be available.

If the viewing window zoom level is not the same as the closest zoom level determined at block 604, then a block 610 may determine at least two zoom levels containing map data including style attribute data, where the at least two zoom levels define a range that includes the viewing window zoom level. In other words, the block 610 may determine two additional zoom levels such that the viewing window zoom level is between the two additional zoom levels. A closest zoom level of block 604 may be used as a first zoom level for block 610. A second zoom level may then be determined by searching a closest zoom level in an opposite direction from the viewing window zoom level of block 602. For example, if block 604 determined a zoom level closest to the viewing window zoom level at a subsequent higher zoom level, block 610 may determine a prior lower zoom level as a second zoom level, and vice versa.

In one embodiment, a block 612 may interpolate the style parameter values of the two zoom levels to produce interpolated style attribute data for use in rendering the map display. A block 614 may, based on the interpolated style attribute data of the block 612, render the map surface for the viewing window at the viewing window magnification/zoom level. In an embodiment, block 612 may include determining an interpolation parameter, and utilizing the interpolation parameter to interpolate the style attribute data. The interpolation parameter may generally represent a degree of a particular style attribute corresponding to a first zoom level of the two zoom levels versus a degree of the particular style attribute corresponding to a second zoom level of the two zoom levels. In an embodiment, the interpolation parameter is determined based on the viewing window zoom level. As an illustrative example, if the viewing window zoom level is halfway between the first zoom level and the second zoom level, the interpolation parameter may correspond to 50% of particular style attribute corresponding to the first zoom level and 50% of the particular style attribute corresponding to the second zoom level. As another illustrative example, if the viewing window zoom level is one quarter of the way from the first zoom level to the second zoom level, the interpolation parameter may correspond to 75% of particular style attribute corresponding to the first zoom level and 25% of the particular style attribute corresponding to the second zoom level.

In another embodiment, the interpolation parameter may be determined and varied over time. As an illustrative example, if the viewing window zoom level is changed from the first zoom level to the second zoom level, the interpolation parameter may be varied over a time period so that the interpolated style parameter changes gradually over time from 100% of a particular style attribute corresponding to the first zoom level, to 50% of the particular style attribute corresponding to the first zoom level and 50% of the particular style attribute corresponding to the second zoom level, until finally becoming 100% of the particular style attribute corresponding to the second zoom level. For example, the map display may be "animated" so that a feature, e.g., a road width, initially is displayed corresponding to a first style parameter value (e.g., corresponding to the first zoom level), and gradually is changed over time so that the feature is eventually displayed corresponding to a second style parameter value (e.g., corresponding to the second zoom level). Thus, in an embodiment, the map surface may initially be rendered with style data of one of the zoom levels (e.g., a closest zoom level) until a trigger is activated. A trigger may be an event in which a current viewing window zoom level is changed to exceed a threshold zoom level, for example. When the trigger occurs, blocks 612 and block 614 may be repeated over time so that interpolated style attributes are gradually changed over time (e.g., from the first zoom level to the second zoom level) and the map surface is "animated" so that the rendering of map features changes gradually over time.

Figure 7:
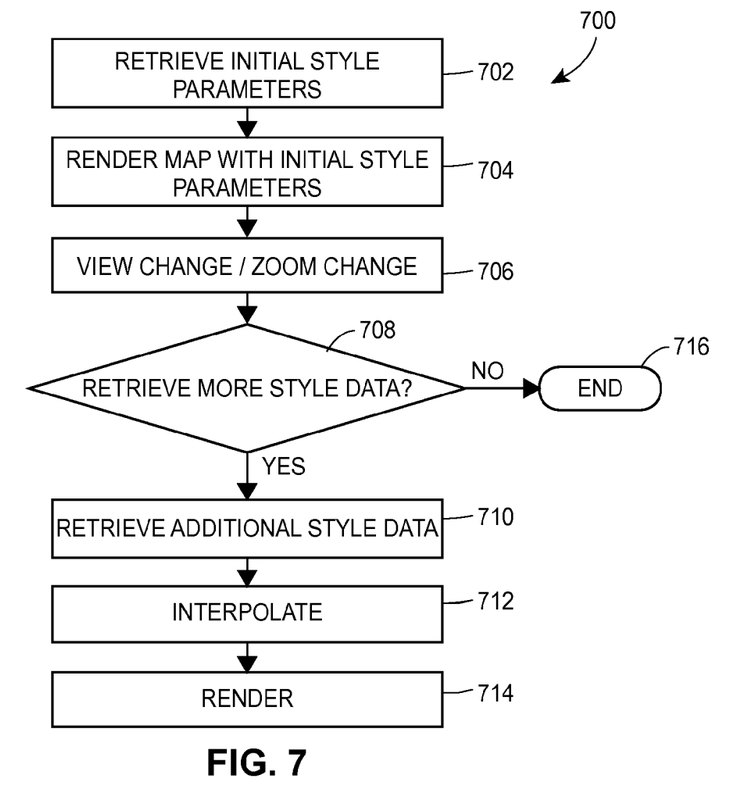
FIG. 7 illustrates a process flow diagram for retrieving style attribute data and for interpolating the style data for rendering a feature of a map, according to an embodiment.

FIG. 7 illustrates a process flow 700 for a mapping application, according to an embodiment. An initial zooming level, e.g., at an initial mapping application startup, may be predetermined to be a zoom level in which a complete set of map data, including style attribute data, is designated for that zoom level. In this case, an initial set of style parameters is first retrieved at a block 702 and used to render the map at block 704. In one embodiment, when the initial zooming level does not include style attribute data appropriate for the initial zooming level, the process of FIG. 6 may be executed so that the rendering of block 704 is based on style attribute data that corresponds with its zoom level (via a previous interpolation). The mapping application may initiate a view change at block 706, such as a zooming change, and the mapping application may determine whether additional map data is to be retrieved at block 708. Block 708 may determine that additional zoom level style data is needed if the style attribute data used to render the viewing window at block 704 corresponds to data provided for a single zoom level (i.e., the zoom level of the initial viewing window) without prior interpolation (i.e., only one data point exists). In a case where the initial viewing is rendered based on a prior interpolation, block 708 may determine whether the new zoom level of bock 706 is within the prior interpolation range. If the new zoom level is within the prior interpolation range, then additional style data may not be needed and the process may end at block 716. In this case, style data from the prior interpolation (based on at least two style attribute data points) can be used to provide appropriate style data for the new zoom level of block 706. In a different embodiment, even though the new zoom level is within a prior interpolation range, block 708 may still determine to retrieve additional data. This may be the case in a situation in which greater interpolation accuracy is required (to be discussed further below).

It should be noted that some view changes may not affect style parameters (e.g., a viewing window direction). Zoom changes, however, usually do affect some style parameters. Also, not all the available set of style parameters may be affected by the view change and thus, sometimes only a subset of style attributes may be retrieved.

If additional map data is needed for rendering, the mapping application determines and retrieves an additional amount of map data at block 710 that includes at least one additional style parameter value (e.g., for the reduced set of style parameters). The process then determines a new set of style parameter values at a block 712 for the view change by interpolating the newly retrieved style parameter values of block 710 and the previous style parameter values of block 702. Because interpolation needs at least two data points, the minimum amount of additional data retrieved at block 710 is at least a one additional style parameter value. The viewing window may be re-rendered at block 714 based on the interpolated style data. In an embodiment, blocks 712 and 714 may be repeated and an interpolation parameter utilized at block 712 is changed over time so that so that the interpolated style parameter changes gradually over time from 100%, for example, of a particular style attribute corresponding to the first zoom level, to 50% of the particular style attribute corresponding to the first zoom level and 50% of the particular style attribute corresponding to the second zoom level, until finally becoming 100%, for example, of the particular style attribute corresponding to the second zoom level.

In some embodiments, when a determined, selected, or current zoom level is outside the range of interpolation data, extrapolation based on existing style attribute data points may be used to adjust a style parameter. In some of these embodiments, extrapolation may be a default process of adjusting a style parameter when no attribute data exists that is appropriate for a given zoom level and the given zoom level is outside the range style attribute data points that can be used for interpolation.

While the described method and system may be illustrated for interpolating style parameters over zooming ranges, other view changes that require a style parameter value to be adjusted may be implemented in a similar manner using the described method and system. For example, where style changes may be adjusted for changes in viewing direction, the same interpolation method and system may be used to provide values for the style aspects over the viewing window direction change.

Because retrieving and processing map data incurs a bandwidth cost and a processing cost, receiving too much style parameter data may negate the savings of interpolating at the client. Additional modifications to the described method and system may thus function to reduce the number style attributes that are retrieved in a set of style parameters (i.e., number of elements in the set) as well as limit the number of sets of style parameters needed to perform interpolation calculations.

Figure 8:
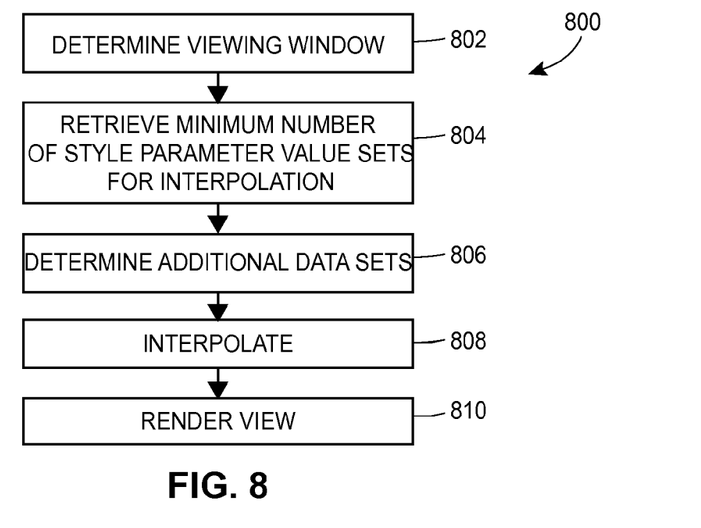
FIG. 8 illustrates a process flow for handling additional data sets of style parameters, according to an embodiment.

FIG. 8 illustrates a process flow 800 for handling additional data sets of style parameters, according to an embodiment. Where style attribute data is associated with particular zoom levels, additional data sets correspond to additional attribute data of other zoom levels. Block 802 determines an initial viewing window state having an initial zoom level and corresponding initial magnification. Block 804 may determine a minimum number of style attribute data sets (e.g., how many zoom levels of style attribute data) to retrieve for an initial rendering of the viewing window. When a viewing window zoom level is chosen (e.g., by a user) that coincides with a zoom level having available style data scaled for that zoom level (i.e., the style data corresponds to or is appropriate for a feature rendered at that zoom level), the viewing window may be rendered without interpolation and without a second style attribute data set. Alternatively, two style attribute data sets corresponding to two different zoom levels surrounding the chosen zoom level may be retrieved and interpolated to provide the style parameter data for the chosen zoom level. In an embodiment, at least one of the two style attribute data sets is retrieved prior to determining the viewing window (block 802). For example, a style attribute data set for a zoom level 3 may have been retrieved previously when, at block 802, a viewing window corresponding to a zoom level 4 is determined. As another example, a style attribute data set for both the zoom level 3 and a zoom level 6 may have been retrieved previously when, at block 802, a viewing window corresponding to a zoom level 4 is determined.

A block 806 may determine, depending on a number of factors, whether to retrieve for an initial view rendering style attribute data that includes more than a minimum two data sets of style parameter values used in performing interpolation. When this additional data is retrieved at one time, interpolation calculations may be performed for an entire range of zoom levels at one time. Additional style attribute data (i.e., additional sets of style parameter values) corresponding to zoom levels beyond what is minimally needed (e.g., to perform a basic interpolation) may be retrieved and processed depending on factors such as a type of style parameter, a frequency or likelihood of additional view changes in the near future, a degree of accuracy desired for interpolating a style parameter, etc. It should be noted that these parameters may be interrelated to each other. Further, when determining whether to retrieve and interpolate additional data points, the techniques may involve some indication that additional map data points/style attribute data is available. For example, the client may be provided information about what zoom levels are associated with additional map data and/or what zoom levels have additional map data for retrieval (map data that includes additional style attribute data).

A block 808 may interpolate the sets of style parameters determined/retrieved in blocks 804 and 806. A block 810 may then render a feature of a map surface using the interpolated style attribute values. In an embodiment, blocks 808 and 810 may be repeated and an interpolation parameter utilized at block 808 is changed over time so that the interpolated style parameter changes gradually over time from 100%, for example, of a particular style attribute corresponding to the first zoom level, to 50% of the particular style attribute corresponding to the first zoom level and 50% of the particular style attribute corresponding to the second zoom level, until finally becoming 100%, for example, of the particular style attribute corresponding to the second zoom level.

Increasing the number of data points for interpolation generally increases the accuracy of the interpolation. For example, in addition to rendering a smooth change between a first and second zoom level within two interpolation points, the described method and system may require that additional data points that define a range of zoom levels be interpolated in advance for the range so that a transition anywhere within the range is more accurate for the entire range.

The tradeoff with increasing interpolation accuracy may often be additional bandwidth and processing capacity needed for retrieving and/or processing the additional data points. A level of interpolation accuracy may depend on a resolution parameter that may be set by a user or automatically set by the mapping application. Processor capacity for performing interpolation calculations may be considered. For example, a current processor capacity may be checked against a threshold. Where the processor that is to perform the interpolation (e.g., the processor of the graphics card) may generally be more efficient in calculating and/or performing interpolation mathematics, decisions of whether to download a plurality of additional style data points may depend more on bandwidth and/or latency considerations associated with retrieving the additional style data points from the server. In some embodiments, bandwidth considerations may depend on checking whether a current bandwidth/time-to-download for retrieving style attribute data is above a threshold. For example, the client may check a current download rate of a retrieval process to determine whether to retrieve additional style parameters. This may also depend on the amount of style data that may be requested.

Figure 9:
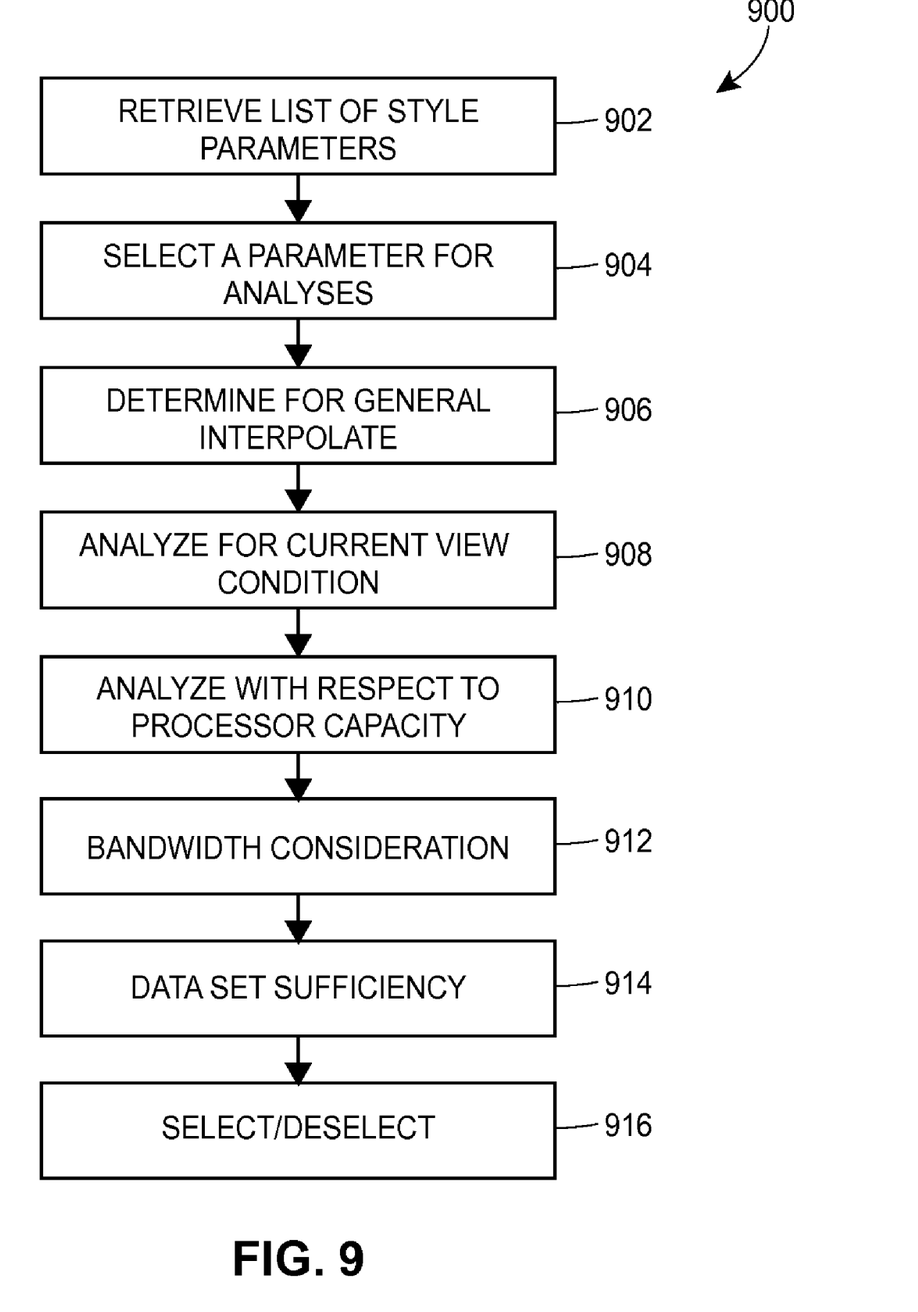
FIG. 9 illustrates a process for determining what style parameters to include in reduced style attribute data set, according to an embodiment.

While the process of FIG. 8 determines how may style attribute data sets to retrieve, FIG. 9 illustrates a process for determining what style parameters to include in each data set, according to an embodiment. Generally, a system may provide a complete set of style attribute values whenever any style attribute value is retrieved and/or requested. For example, a complete style attribute lookup table may be retrieved each time map data is retrieved and rendered for a new zoom level. Alternatively, only a subset of style parameters available for retrieval may be retrieved, requested, or processed. Using the described techniques herein, a subset or reduced set of style parameters may be determined based on whether the style parameters can be interpolated and how those style parameters may be interpolated.

FIG. 9 illustrates a process flow 900 for determining a reduced set of style parameters that may be subject to interpolation functions, according to an embodiment. At block 902, a set of style parameters may be retrieved. In some embodiments, this may include a complete set of all style parameters (this may be a listing of all style parameters) that can be used by a mapping application. In some situations, this may represent only a subset. At block 904 a style parameter is selected for processing.

Some style parameters cannot or are chosen not to be interpolated. Block 906 may determine whether a style parameter is designated for interpolation. This determination may be performed based on an associated flag, attribute, or other indicator associated with the style parameter indicating whether the style parameter is suitable for interpolation or can be subject to interpolation. The flag may be set by a map application designer based on aesthetic considerations of the map. Some style parameters do not represent values that can be interpolated or extrapolated. For example, where a style parameter value is selected from a set of fixed values, no interpolation may be possible or appropriate.

Some style parameters may not be suitable for interpolation because an interpolation function used by the graphics processor may not be suitable for interpolating the values of a particular style parameter. Depending on the capabilities of the processor that is to calculate the interpolation, sometimes only a linear interpolation may be implemented. Perhaps other interpolations such as exponential interpolations may be more suitable for calculating, for example, a curve, which the graphics processor is not programmed to perform. In this case, the method and system may simply determine that a particular style parameter will not be interpolated. In which case a default value may be used for the style parameter value in lieu of interpolation.

Block 908 may determine whether a style parameter can be interpolated based on a current viewing or rendering condition. Some style parameters may not be subject to interpolation because of a current viewing condition, such as a current zoom level range. For example, certain style parameters may only be relevant at higher zoom levels than lower zoom levels. In those cases, the style parameters may not be retrieved and interpolated until a zoom level adjustment to the higher zoom level is initiated.

Block 910 may determine whether a style parameter is to be interpolated based on a priority parameter. Similar to the interpolation indication, the priority parameter may be an associated flag, attribute, or other indicator associated with the style parameter indicating a priority value. This priority parameter may be used by the mapping system to determine a set of high priority style parameters to retrieve and process over low priority style parameters. This may be the case when a current condition of the mapping application requires reduced data retrieval and/or processing due to processor load. For example, where the processor is overloaded or backed up (the processor capacity is low or below a threshold), low priority style parameters may not be retrieved and interpolated to reduce processor workload.

Block 912 may determine whether high and/or low priority style parameters (based on priority attribute) will be retrieved and processed based on a current bandwidth of a retrieval path, channel, or connection. For example, block 902 may determine not to retrieve and process low priority style parameters when bandwidth is below a threshold.

Block 914 determines whether there is data sufficient for interpolating the style parameter. Interpolation generally requires at least two data points.

Block 916 may select or not select the style parameter for retrieval and/or processing based blocks 904-914. Blocks 904-914 may be repeated to determine a reduced set of style parameters for retrieval and processing.

Any suitable subset of the blocks may be implemented in any suitable order by a number of different devices (e.g., client or server) and remain consistent with the method and system described herein. Moreover, additional determination blocks may be added to refine the filtering of style parameters subject to interpolation processing.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for rendering a map on a display device comprising:

determining, using one or more processing devices, a viewing window of a map surface defined by a magnification of the surface of the map, and wherein a zoom level of the viewing window corresponds to the magnification of the viewing window of the map surface;

determining, using one or more processing devices, a first set of style parameters for a first feature of the map surface, the first set of style parameters corresponding to a first zoom level of the viewing window and wherein the first zoom level has a first magnification;

determining, using one or more processing devices, a second set of style parameters for the first feature of the map surface, the second set of style parameters corresponding to a second zoom level of the viewing window and wherein the second zoom level has a second magnification;

determining, using one or more processing devices, a third set of style parameters by interpolating between at least the first set of style parameters at the first magnification and the second set of style parameters at the second magnification;

retrieving, using one or more processing devices, a fourth set of style parameters for the first feature of the map surface if a current bandwidth of a communication link with a server is above a threshold, wherein the server provides the fourth set of style parameters and the fourth set of style parameters corresponds to a fourth zoom level of the viewing window and to a fourth magnification;

if the fourth set of style parameters is retrieved, then determining the third set of style parameters for the third zoom level includes interpolating at least the first set of style parameters at the first magnification, the second set of style parameters at the second magnification, and the fourth set of style parameters at the fourth magnification, wherein the third magnification is different from the first, second, and fourth magnification; and displaying, using one or more processing devices, the first feature using the third set of style parameters.

2. The computer-implemented method of claim 1, wherein determining the third set of style parameters includes using an interpolation parameter to interpolate between at least the first set of style parameters at the first magnification and the second set of style parameters at the second magnification;

wherein the method further comprises:
changing the interpolation parameter over time; and
repeating the acts of i) determining the third set of style parameters, and ii) displaying the first feature using the third set of style parameters, in response to changing the interpolation parameter over time.

3. The computer-implemented method of claim 1, wherein the third set of style parameters corresponds with a third zoom level having a third magnification that is different from the first and the second magnification and wherein the first feature is displayed at the third zoom level using the third set of style parameters.

4. The computer-implemented method of claim 3, further wherein determining the third set of style parameters includes interpolating a magnitude of at least one of the style parameters over the first and the second magnification.

5. The computer-implemented method of claim 4, wherein the at least one style parameter is a length dimension of the feature.

6. The computer-implemented method of claim 3, wherein each of the first, the second and the third set of style parameters are a set of color values for the feature.

7. The computer-implemented method of claim 3, wherein determining the first set of style parameters includes determining a set of style parameters of a current zoom level of the viewing window, and wherein determining the second set of style parameters includes retrieving a set of style parameters for a subsequent zoom level, wherein the third zoom level corresponds to a magnification between the magnification of the first and second zoom level.

8. The computer-implemented method of claim 3, wherein the third zoom level corresponds to a magnification between the magnification of the first and second zoom level.

9. The computer-implemented method of claim 3, further including extrapolating, using one or more processing devices, a style parameter value for a zoom level that is outside a range of interpolation of the first and second set of style parameters.

10. The computer-implemented method of claim 3, wherein the set of style parameters are stored in a lookup table that is associated with a set of vertex data points, wherein the first and the second set of style parameters are located in a first and a second lookup table, each of the lookup tables associated with a different zoom level at a different magnification.

11. The computer-implemented method of claim 3, wherein the fourth set of style parameters is retrieved when a fifth zoom level is selected, wherein the fourth zoom level has a fourth magnification and the fifth zoom level has a fifth magnification between the fourth magnification and each of the first, second, and third magnifications.

12. The computer-implemented method of claim 3, wherein determining the first set and the second set of style parameters includes retrieving only a subset of style parameters available for retrieval based on a style attribute setting associated with each style parameter indicating whether the style parameter is designated for interpolation.

13. The computer-implemented method of claim 3, wherein determining the first set and the second set of style parameters includes retrieving only a subset of the style parameters available for retrieval based on a priority attribute associated with each style parameter and whether a current available bandwidth is above a threshold.

14. The computer-implemented method of claim 3, wherein determining the first set and the second set of style parameters includes retrieving only a subset of the style parameters available for retrieval based on a priority attribute and whether a current processor capacity is above a threshold.

15. The computer-implemented method of claim 3, wherein determining the first set and the second set of style parameters includes retrieving only a subset of the style parameters available for retrieval based on whether the third zoom level is outside a range of interpolation.

16. The computer-implemented method of claim 1, further including determining, using one or more processing devices, whether to retrieve the fourth set of style parameters for the first feature of the map surface based on a resolution setting of a display device.

17. The computer-implemented method of claim 1, further including determining, using one or more processing devices, whether to retrieve the fourth set of style parameters for the first feature of the map surface based on a current capacity of one of the one or more processing devices.

18. A computer device comprising:
a communications network interface;
one or more processors;
one or more memories coupled to the one or more processors;
a display device coupled to the one or more processors;
wherein the one or more memories include computer executable instructions stored therein that, when executed by the one or more processors, cause the one or more processors to
determine a first view of a map surface defined by a first magnification of the surface of the map, and wherein a first zoom level of the first view corresponds to the first magnification,
retrieve a first set of style parameters for a first feature of the map surface, the first set of style parameters corresponding to the first zoom level,
retrieve a second set of style parameters for the first feature of the map surface, the second set of style parameters corresponding to a second zoom level, wherein the second zoom level corresponds to a second magnification,
determine a third set of style parameters for the first feature of the map surface at a third zoom level by interpolating the first set of style parameters and the second set of style parameters,
retrieve a fourth set of style parameters for the first feature of the map surface via the communications network interface if a current bandwidth of a communication link of the communications network interface is above a threshold, the fourth set of style parameters corresponding to a fourth zoom level of the first view and corresponding to a fourth magnification;
if the fourth set of style parameters is retrieved, then determine the third set of style parameters for the third zoom level by interpolating at least the first set of style parameters at the first magnification, the second set of style parameters at the second magnification, and the fourth set of style parameters at the fourth magnification, wherein the third magnification is different from the first, second, and fourth magnification; and
determine a second view of the map surface defined by the third zoom level, and wherein the third zoom level corresponds to a third magnification.

19. The computer device of claim 18, wherein determining the third set of style parameters includes using an interpolation parameter to interpolate between at least the first set of style parameters at the first magnification and the second set of style parameters at the third magnification;
wherein the method further comprises:
changing the interpolation parameter over time; and
repeating the acts of i) determining the third set of style parameters, and ii) displaying the first feature using the third set of style parameters, in response to changing the interpolation parameter over time.

20. The computer device of claim 18, wherein the one or more memories include computer executable instructions stored therein that, when executed by the one or more processors, cause the one or more processors to render on the display device the first feature in the second view at the third zoom level using the third set of style parameters, wherein the third magnification is different from the first and the second magnification.

21. The computer device of claim 20, wherein the one or more memories include computer executable instructions stored therein that, when executed by the one or more processors, cause the one or more processors to retrieve only a subset of style parameters available for retrieval based on a style attribute setting associated with each of the style parameters indicating whether the style parameter is designated for interpolation.

22. The computer device of claim 21, wherein the one or more memories include computer executable instructions stored therein that, when executed by the one or more processors, cause the one or more processors to retrieve only a subset of style parameters available for retrieval based on a style priority attribute associated with each of the style parameters.

23. The computer device of claim 21, wherein the one or more memories include computer executable instructions stored therein that, when executed by the one or more processors, cause the one or more processors to retrieve only a subset of style parameters available for retrieval based on whether a current available bandwidth is above a threshold.

24. The computer device of claim 21, wherein the one or more memories include computer executable instructions stored therein that, when executed by the one or more processors, cause the one or more processors to retrieve only a subset of style parameters available for retrieval based on whether a current processor capacity is above a threshold.

25. The computer device of claim 20, wherein the one or more memories include computer executable instructions stored therein that, when executed by the one or more processors, cause the one or more processors to retrieve only a subset of the style parameters available for retrieval based on whether the third zoom level is between the first and second zoom level.

26. The computer device of claim 20, wherein the one or more memories include computer executable instructions stored therein that, when executed by the one or more processors, cause the one or more processors to
retrieve the fourth set of style parameters for the first feature of the map surface when a resolution setting of a display screen is increased.

27. The computer device of claim 20, wherein the one or more memories include computer executable instructions stored therein that, when executed by the one or more processors, cause the one or more processors to
retrieve the fourth set of style parameters for the first feature of the map surface when a current bandwidth is above a threshold, wherein the fourth zoom level corresponds to a fourth magnification different from the first, the second, and the third magnification.

28. A computer device comprising:
a communications network interface;
one or more processors;
one or more memories coupled to the one or more processors;
a display device coupled to the one or more processors;
wherein the one or more memories include computer executable instructions stored therein that, when executed by the one or more processors, cause the one or more processors to
determine a view of a map surface defined by a target magnification of the surface of the map, and wherein a target zoom level of the view corresponds to the target magnification;
retrieve a first set of style parameters for a first feature of the map surface, the first set of style parameters corresponding to a zoom level closest to the target zoom level;
determine if the first set of style parameters corresponds to the target zoom level;
render the first feature in the view at the target zoom level using the first set of style parameters if the first set of style parameters corresponds to the target zoom level;

retrieve a second set of style parameters for the first feature of the map surface if the first set of style parameters does not correspond to the target zoom level, the first set of style parameters corresponding to a first zoom level and a first magnification and the second set of style parameters corresponding to a second zoom level and a second magnification, wherein the first and the second magnification are different from the target magnification and wherein the target zoom level is between the first and the second zoom level;

determine a third set of style parameters for the first feature of the map surface at the target zoom level based on interpolating the first and the second set of style parameters;

retrieve a fourth set of style parameters for the first feature of the map surface via the communications network interface if a current bandwidth of a communication link of the communications network interface is above a threshold, the fourth set of style parameters corresponding to a fourth zoom level of the view and corresponding to a fourth magnification;

if the fourth set of style parameters is retrieved, then determine the third set of style parameters for the first feature at the target zoom level by interpolating the first set of style parameters at the first magnification, the second set of style parameters at the second magnification and the fourth set of style parameters at the fourth magnification; and render the first feature at the target zoom level using the third set of style parameters.

* * * * *